(12) United States Patent
Kothuru et al.

(10) Patent No.: US 11,735,950 B2
(45) Date of Patent: Aug. 22, 2023

(54) SUPPLEMENTAL POWER UNIT FOR DRILLING RIG

(71) Applicant: SCHLUMBERGER TECHNOLOGY CORPORATION, Sugar Land, TX (US)

(72) Inventors: Seetharam Kothuru, Houston, TX (US); Brian McKinney, Katy, TX (US); Ramakrishna Madhireddy, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 142 days.

(21) Appl. No.: 16/759,442

(22) PCT Filed: Oct. 29, 2018

(86) PCT No.: PCT/US2018/057917
§ 371 (c)(1),
(2) Date: Apr. 27, 2020

(87) PCT Pub. No.: WO2019/084530
PCT Pub. Date: May 2, 2019

(65) Prior Publication Data
US 2020/0270948 A1 Aug. 27, 2020

Related U.S. Application Data

(60) Provisional application No. 62/577,778, filed on Oct. 27, 2017.

(51) Int. Cl.
*H02J 7/34* (2006.01)
*H02J 5/00* (2016.01)
(Continued)

(52) U.S. Cl.
CPC .............. *H02J 7/345* (2013.01); *E21B 44/00* (2013.01); *H02J 3/28* (2013.01); *H02J 5/00* (2013.01);
(Continued)

(58) Field of Classification Search
CPC ..... E21B 44/00; H02J 3/28; H02J 5/00; H02J 15/007; H02J 7/0013; H02J 7/0047; H02J 7/345
See application file for complete search history.

(56) References Cited

U.S. PATENT DOCUMENTS 6,639,331 B2   10/2003   Schultz
8,519,565 B2   8/2013    Dozier et al.
(Continued)

FOREIGN PATENT DOCUMENTS

EP      2569844 A2      3/2013
KR      20160039901 A  * 12/2016  ................ B63J 3/04
(Continued)

*Primary Examiner* — Daniel Cavallari
(74) *Attorney, Agent, or Firm* — Jeffrey D. Frantz

(57) ABSTRACT

Systems and methods for supplementing power to a drilling operation's generator and motor systems are disclosed. A power unit is connected to a power grid between generators and motors for a drilling operation. The power unit saps and stores energy from the electrical grid when the generator has excess capacity and providing power to the motors when the demand from the motors exceeds the available capacity of the generators.

11 Claims, 3 Drawing Sheets

(51) Int. Cl.
  *H02J 15/00*   (2006.01)
  *H02J 3/28*    (2006.01)
  *E21B 44/00*   (2006.01)
  *H02J 7/00*    (2006.01)

(52) U.S. Cl.
  CPC .......... *H02J 7/0047* (2013.01); *H02J 15/007* (2020.01); *H02J 7/0013* (2013.01)

(56) References Cited

U.S. PATENT DOCUMENTS

| | | |
|---|---|---|
| 8,604,639 B2 | 12/2013 | Hopwood |
| 9,240,687 B2 | 1/2016 | Carralero et al. |
| 9,644,431 B2 | 5/2017 | Myers et al. |
| 9,803,461 B2 | 10/2017 | Boone |
| 9,806,530 B2 | 10/2017 | Martinez |
| 10,017,993 B2 | 7/2018 | Hu et al. |
| 10,151,178 B2 | 12/2018 | Stephenson et al. |
| 10,243,371 B2 | 3/2019 | Gerdes et al. |
| 10,309,166 B2 | 6/2019 | Thiemann et al. |
| 11,081,901 B2 * | 8/2021 | Causey ................ H02J 7/0071 |
| 2009/0195074 A1 | 8/2009 | Buiel |
| 2009/0312885 A1 * | 12/2009 | Buiel ........................ H02J 3/38 |
| | | 700/297 |
| 2013/0271083 A1 * | 10/2013 | Williams .................. H02J 7/00 |
| | | 320/128 |
| 2014/0354081 A1 | 12/2014 | Li et al. |
| 2015/0053483 A1 * | 2/2015 | Mebane, III ............ E21B 12/02 |
| | | 175/26 |
| 2016/0215769 A1 | 7/2016 | Haapanen et al. |
| 2017/0211338 A1 | 7/2017 | Myers et al. |
| 2017/0229869 A1 | 8/2017 | Boone et al. |
| 2018/0035566 A1 | 2/2018 | Held et al. |
| 2018/0066506 A1 | 3/2018 | Boone |
| 2018/0109110 A1 | 4/2018 | Gerdes et al. |
| 2019/0048666 A1 | 2/2019 | Orban et al. |
| 2019/0048667 A1 | 2/2019 | Krippner et al. |
| 2019/0071966 A1 | 3/2019 | Orban |
| 2019/0115758 A1 | 4/2019 | Orban et al. |
| 2020/0220135 A1 * | 7/2020 | Pedersen ............... H02J 7/0042 |

FOREIGN PATENT DOCUMENTS

| | | |
|---|---|---|
| WO | 2018201118 A1 | 11/2018 |
| WO | 2018213925 A1 | 11/2018 |

* cited by examiner

SUPPLEMENTAL POWER UNIT FOR DRILLING RIG

CROSS-REFERENCE TO RELATED APPLICATIONS

This application claims priority to U.S. Provisional Patent Application No. 62/577,778, which was filed on Oct. 27, 2017, the entirety of which is incorporated by reference herein.

BACKGROUND

Drilling rigs are large and complex and involve many pieces of equipment and require large quantities of power and coordination to operate. Among the equipment is a top drive that is used to provide torque to the drill string that can reach deep into a wellbore. The power requirements of the top drive and of other components of the drilling operation can be immense and sometimes vary substantially, needing much power one moment and comparatively little the next.

SUMMARY

Embodiments of the present disclosure are directed to a system for providing power, including one or more generators configured to provide a predetermined quantity of energy, and one or more motors configured to draw power from the generators to perform one or more operations. The system also includes an electrical grid system configured to convey electrical power from the generators to the motors, and a power unit electrically coupled to the electrical grid. The power unit can selectively draw power from the electrical grid system, store power drawn from the electrical grid system, and selectively provide power to the motor to enable the motors to perform one or more of the operations. The power provided by the power unit is greater than the predetermined quantity of energy.

In further embodiments the system includes a computation component operably coupled to the power unit and configured to store a well plan describing power needs of the motor. The power unit is configured to provide power to the motor according to the well plan.

Other embodiments of the present disclosure are directed to a method including coupling a power unit to an electrical grid system, the electrical grid system being operatively coupled between a generator system and a motor system. The generator system is configured to power the motor system. The method also includes determining a first time period during which available power from the generator system is greater than the power required by the motor system, and a second time period during which power required by the motor system is greater than a quantity available from the generator system. The method also includes sapping power from the electrical grid system during the first time period and providing power to the electrical grid system during the second time period.

In yet further embodiments the present disclosure is directed to a power system including a generator, a prime mover, and an electrical bus operatively coupled between the generator and prime mover. Power from the generator is delivered to the prime mover via the electrical bus. The power system also includes a power storage unit, a power receiving unit operatively coupled to the electrical bus and configured to sap power from the electrical bus and to store the power in the power storage unit, and a power delivery unit operatively coupled to the electrical bus and configured to deliver the power from at least one of the power storage unit and the electrical bus to the prime mover. The power system also includes a control unit operatively coupled to the power receiving unit and to the power delivery unit and configured to instruct the power receiving unit to sap power and to instruct the power delivery unit to deliver the power. The control unit may also store a well plan dictating amounts of power and demand times of the power. The control unit is configured to instruct the power receiving unit and power delivery unit according to the well plan.

DETAILED DESCRIPTION

Figure 1:
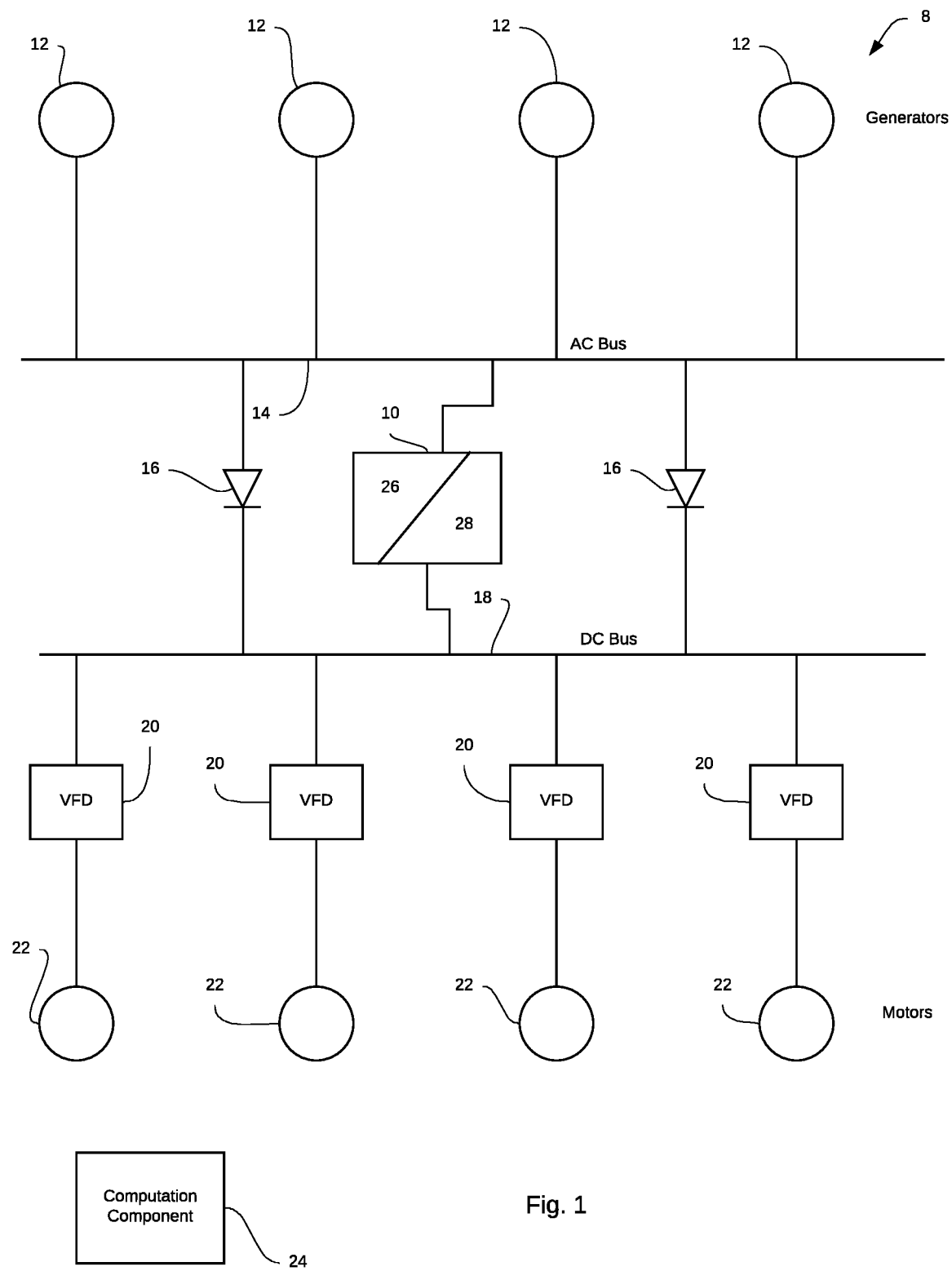
FIG. 1 is a schematic diagram of a power system for a drilling operation according to embodiments of the present disclosure.

FIG. 1 is a schematic diagram of a power system 8 for a drilling operation according to embodiments of the present disclosure. The power system 8 includes generators 12, an AC Bus 14, rectifiers 16, a DC Bus 18, several variable frequency drives (VFDs) 20 and several motors 22. The generators 12 typically run on diesel gasoline or another fuel source and provide power to the AC Bus 14 which is converted to DC power by the rectifiers 16 and transmitted to the DC Bus 18. The VFDs 20 operate with the motors 22 to operate equipment on the drill site. There can be any number of generators 12, rectifiers 16, VFDs 20, and motors 22 as needed in a given drilling operation.

The power needs of the motors 22 vary during the drilling operation. Occasionally, the needs of the motors 22 can even exceed the capabilities of the generators 12, but there are also times where the motors 22 require less power than what is available. According to embodiments of the present disclosure, a power unit 10 is operatively coupled to the AC Bus 12 with a rectification system 16 and is configured to store power and to provide occasional power to the AC Bus 14 as needed by the system 8. In other embodiments the power unit 10 is coupled to the DC Bus 18, or in some embodiments is coupled to both the AC Bus 14 and the DC Bus 18. The power unit 10 can include any suitable electronic equipment including rectifiers, capacitors, batteries, etc. In some embodiments, one or more capacitors store electrical power and, when needed by the motors, supply a fast, powerful burst of energy to the AC Bus 14 or the DC Bus 18 which is used by the motors. When not called upon, the power unit 10 can sap power from the AC/DC Bus to recharge the capacitors. 12.

The motors 22 can be a top drive, a drawworks, a mud pump or series of mud pumps or any other component that consumes power to do work at the rig site. Other, lesser power-consuming components such as HVAC, lighting, communications, and other components at the rig can also be included here. Any power-consuming component can be a motor for purposes of the present disclosure. For brevity these components are referred to herein as "motors" without loss of generality.

In some embodiments, the system 8 can include a computational component 24 that is configured to electrically communicate with components of the system 8. The computational component 24 can store or receive a well plan or drill plan that includes parameters such as timings of certain power needs of the motors 22. The well plan can also include information about the formation including regions of the formation that require more or less power, a speed profile for the formation that details a rate of penetration (ROP) for a given region of the formation, power consumption for a given region of the formation, and a planned drill pattern including any deviations or lateral drilling plans. The well plan can include many other factors that relevant to the drilling operation. The well plan can be created using data captured at other drilling operations that share a characteristic with the present drilling site. For example, if two or more wells are dug in the same general geographic area, it is likely that the drilling operation will encounter similar structures in the formation. The well plan can be derived from the first drilling operation and can be used in the second. In other embodiments the well plan is derived from wells that share any other characteristic even though they may be geographically remote.

The power unit 10 can be operated in accordance with the well plan. The well plan can provide information to the power unit 10 instructing the power unit 10 when additional power is needed, how much power is needed, and also when power consumption is less, during which time the power unit can safely sap power to charge the capacitors (or other suitable storage means). The power unit 10 can be connected to the system 8 at different locations, including at multiple locations. The power unit 10 can comprise a power receiving unit 26 and a power delivery unit 28 which are coupled to the system at different locations. For example, the power receiving unit 26 can be coupled to the generators 12 or to the AC Bus 14 and/or DC Bus 18 and the power delivery unit 28 can be coupled to the AC/DC Bus. There may be multiple power units 10 coupled to the system 8 at different locations. The multiple power units and the components thereof can be operated together in harmony. The power receiving unit 26 for example can be coupled to the power delivery unit 28 such that the power received at the power receiving unit 26 is the same power delivered by the power delivery unit 28 even though these two units are individually coupled to the system at different locations.

Figure 2:
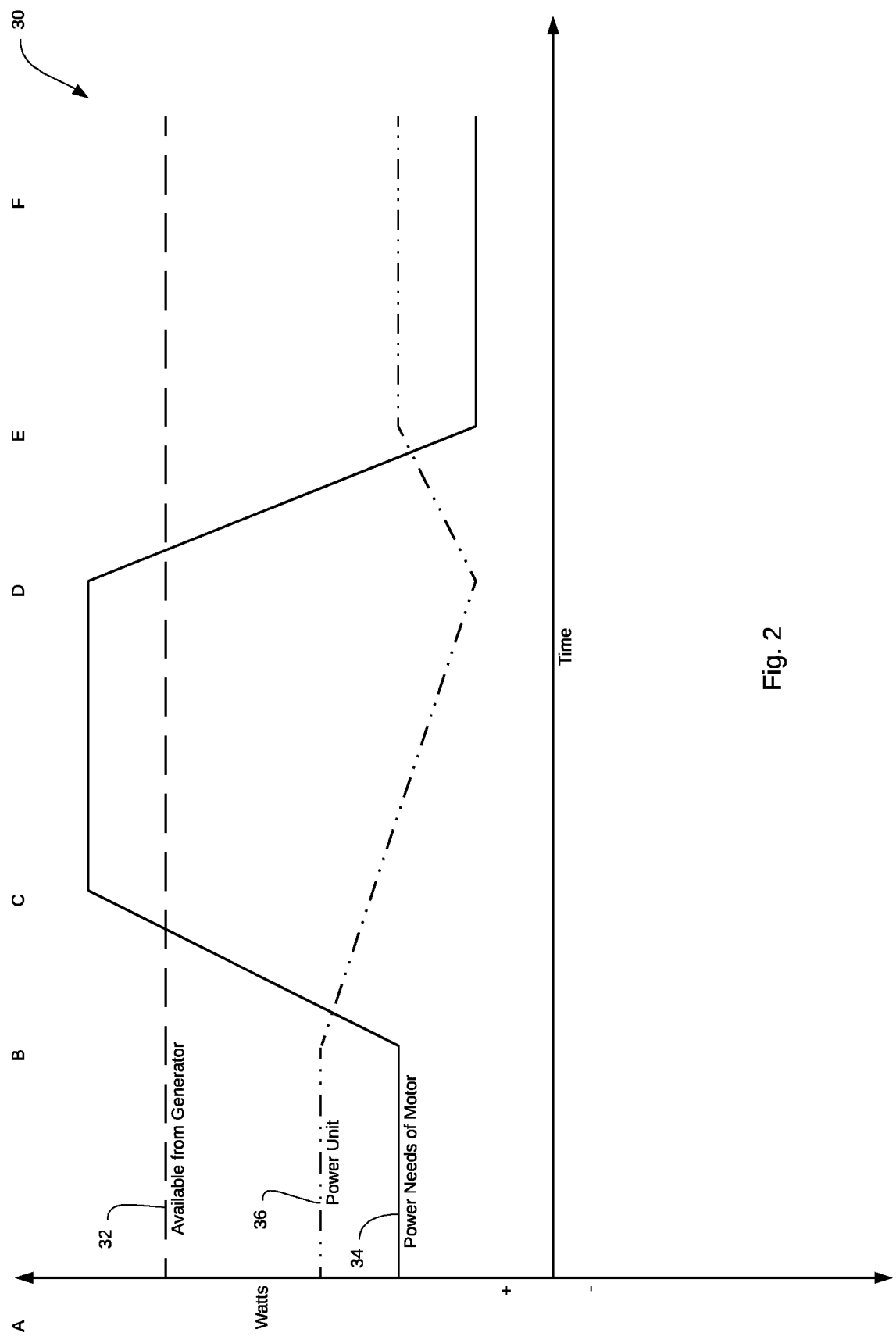
FIG. 2 is a graph of power delivery, consumption, and storage for a generator, motor, and power unit according to embodiments of the present disclosure.

FIG. 2 is a graph 30 of power delivery, consumption, and storage for a generator, motor, and power unit according to embodiments of the present disclosure. It is to be understood that generator refers to one or more generators working together or individually to provide power to a drilling rig, motor refers to one or more motors working together or individually to perform work for a drilling operation, and the power unit refers to one or more power units providing needed power and storing power according to embodiments of the present disclosure. The vertical axis is power in watts (or any other suitable units) and the horizontal axis is time. Time points A-G will be discussed. A is an initial time for reference and can be any arbitrary time in the operation of a drilling operation. For purposes of discussion there is a constant available power level 32 from the generator. In systems using multiple generators, one or more of the generators can be brought online of taken offline which will of course change the available power level. A single generator can be operated at varying levels which will also change the available power level. For ease of explanation the power level from the generator is constant, without limiting the scope of the present disclosure. The power needs of the motor is shown by line 34. Power into the power unit is shown at 36 with positive being power into the power unit and negative being power out of the power unit.

At time A the power needs of the motor are less than the available power from the generator. Accordingly, the power unit is sapping power from the generator and storing the power for later use. Once the power unit reaches full capacity it can cease sapping power. At time B the needs of the motor begin to ramp up until exceeding the capacity of the generators by time C. Starting at time B, the power unit changes from sapping power to providing power to the motor. At time C the power unit is providing the needed power to the motor that the generator cannot provide. At time D the needs of the motor begin to decline until reaching below the available power from the generator. The power unit can observe this is taking place and can (if needed) begin to sap power from the generator again. At time F the power unit reaches capacity and begins to stop sapping power. The system is ready for another spike in power demand.

The shape of these curves can be known in advance according to a well plan. In some embodiments, there is some level of uncertainty between the well plan and the actual needs for a given well. No two wells are exactly alike, so the well plan can provide guidance to the power unit, the motor, and the generator concerning the current and future needs of the system, but actual conditions can vary. The system can update the well plan for use on the next drilling operation. Over time, the accuracy of the well plan will improve with a larger data set from which to pull.

Figure 3:
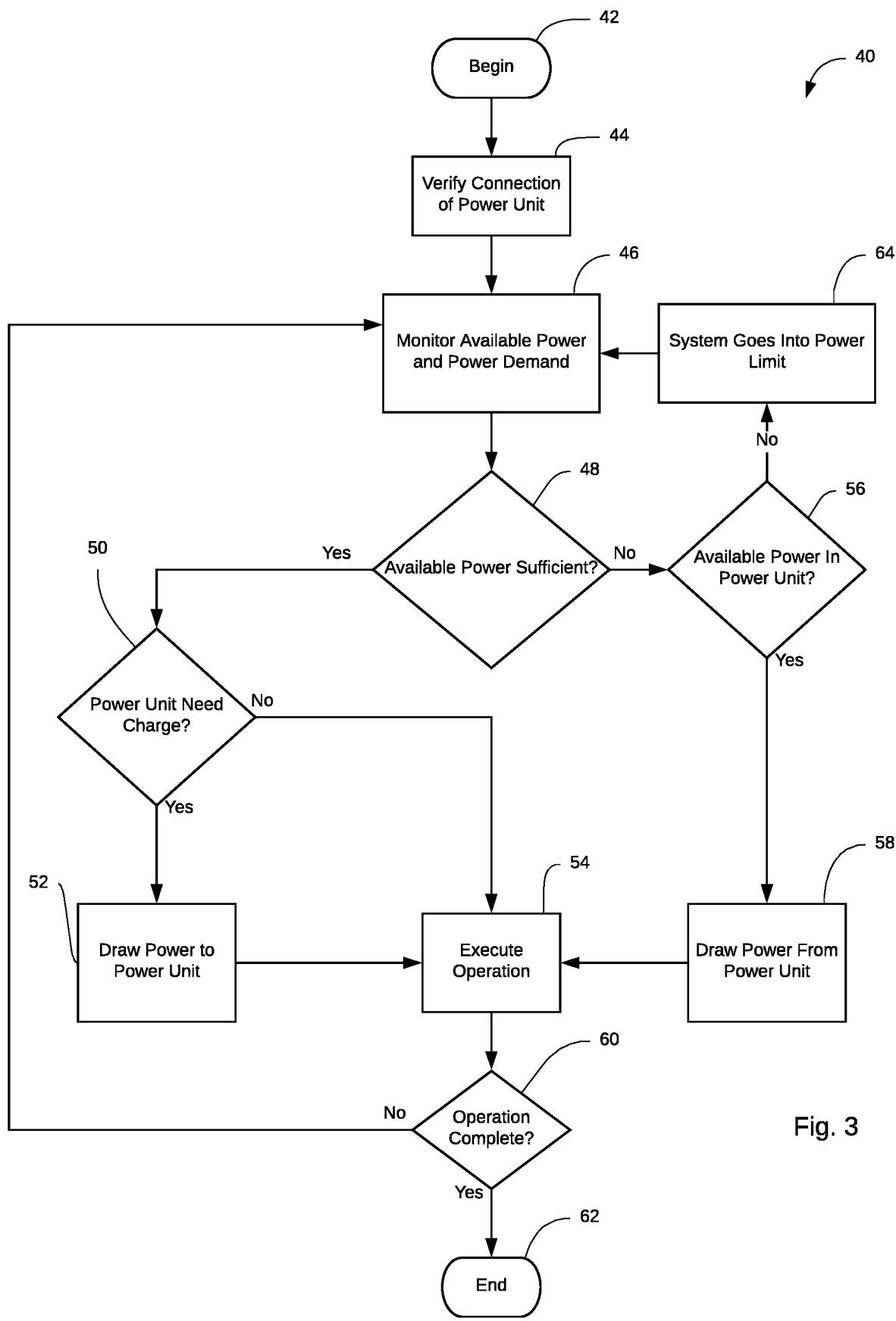
FIG. 3 is a flowchart block diagram showing a method according to embodiments of the present disclosure.

FIG. 3 is a flowchart block diagram showing a method 40 according to embodiments of the present disclosure. At 42 the method 40 begins. The beginning of the method 40 can be any arbitrary point during a drilling operation and is not necessarily the absolute initial stage of the operation. The method 40 can be executed by a combination of the computation component 24 shown in FIG. 1, or it can be executed by logic stored in the power unit 10 or in a remote component configured to execute portions of the method 40. At 44 the connection of the power unit is verified. At 46, the available power and demand for power is monitored. The available power is the power provided by the generator(s) of a given system, and the power demand is the power required by the motors of the system. At 48 the method continues by comparing the available power to the power demands of the motors. This comparison can factor in upcoming power demands according to a well plan or other data that describes not just the current power consumption but an expected power consumption for as long into the future as there is data in the well plan. If the available power is sufficient, at 50 another check is performed to determine whether or not the power unit needs charging. If the power unit does need to charge, at 52 the power unit draws power from the generators. At 54, with sufficient power for the operation, the operation is executed. Periodically at 60 a check can be performed for whether or not a given operation is complete. If yes, the method 40 terminates at 62. If not, control can return to 46 where monitoring continues.

Returning to 48, if there is insufficient power for a given operation or for an upcoming operation according to a well plan, the method 40 includes a check for the power unit to determine whether or not there is sufficient power in the power unit. If so, the system will draw power from the power unit at 58 and execute the operation. If there is insufficient power, at 64 the method can include some sort of preventive measures to limit the power to the system. The method 40 accordingly can allow a power unit to periodically and safely store power for later delivery without interfering with operations and thereby enabling a system to execute operations requiring more power than otherwise would be available. The rate at which power is delivered is another aspect. The power unit can be configured to deliver power at a higher rate than available from a generator.

Embodiments of the present disclosure have been described herein with reference to the Figures. Features have been described to enable a person of ordinary skill in the art to make and use aspects of the present disclosure and are not given in a limiting manner.

The invention claimed is:

1. A system for providing power, the system comprising:
one or more generators configured to provide power;
one or more motors configured to draw the power from the one or more generators to perform one or more operations;
an electrical grid system configured to convey the power from the one or more generators to the one or more motors;
a power unit electrically coupled to the electrical grid system; and
a computing system configured to:
store a well plan, wherein the well plan indicates different power that will be used by the one or more motors at different times, and wherein the well plan includes one or more of: different power that will be used for different regions of a wellbore formation, one or more speed profiles for the different regions of the wellbore formation, and one or more rate of penetration (ROP) for the different regions of the wellbore formation, wherein the well plan describes a future time in which a power need of the one or more motors is greater than available power from the one or more generators;
cause the power unit to selectively draw and store the power from the electrical grid system at least partially in response to the well plan indicating that the power being provided by the one or more generators will be greater than the power being used by the one or more motors, wherein the computing system is configured to instruct the power unit to store sufficient power, from the electrical grid system, for the future time;
cause the power unit to selectively provide the power to the one or more motors to enable the one or more motors to perform one or more of the operations at least partially in response to the well plan indicating that the power being provided by the one more generators will be less than the power being used by the one or more motors, wherein the power provided by the power unit is greater than the power provided by the one or more generators; and
update the well plan in response to an amount of the power drawn and stored, the amount of power provided, or both.

2. The system of claim 1, wherein the one or more motors comprise one or more of a drawworks, a top drive, or a mud pump.

3. The system of claim 1, wherein the electrical grid system comprises at least one of an AC Bus and a DC Bus.

4. The system of claim 1, wherein the electrical grid system comprises an AC Bus and a DC Bus, and the power unit is coupled to both the AC Bus and the DC Bus.

5. The system of claim 4, further comprising a plurality of rectifiers coupled between the AC Bus and the DC Bus.

6. The system of claim 1, wherein the power unit is configured to store the power from the electrical grid system in a battery.

7. The system of claim 1, wherein the computing system is also configured to predict a future time to cause the power unit to draw and store the power, provide the power, or both at least partially in response to the well plan.

8. The system of claim 1, wherein the well plan is created based on data associated with operations at a different wellbore formation.

9. A power system, comprising:
a generator;
a prime mover;
an electrical bus operatively coupled between the generator and prime mover, wherein power from the generator is delivered to the prime mover via the electrical bus;
a power storage unit operatively coupled to the electrical bus; and
a computing system configured to:
store a well plan, wherein the well plan indicates different power that will be used by the prime mover at different times, and wherein the well plan includes one or more of: different power that will be used for different regions of a wellbore formation, one or more speed profiles for the different regions of the wellbore formation, and one or more rate of penetration (ROP) for the different regions of the wellbore formation, wherein the well plan describes a future time in which a power need of the prime mover is greater than available power from the generator;
cause the power storage unit to selectively draw and store the power from the electrical bus at least partially in response to the well plan indicating that the power being provided by the generator will be greater than the power being used by the prime mover, wherein the computing system is configured to instruct the power storage unit to store sufficient power, from the electrical bus, for the future time;
cause the power storage unit to selectively provide the power to the prime mover to enable the prime mover to perform one or more operations at least partially in response to the well plan indicating that the power being provided by the generator will be less than the power being used by the prime mover; and
update the well plan in response to an amount of the power drawn and stored, the amount of power provided, or both.

10. The power system of claim 9, wherein the power storage unit is further configured to sap power from the generator when the generator is operating in a regeneration mode.

11. The power system of claim 9, wherein the power storage unit comprises at least one of: a capacitor and a flywheel.

* * * * *